United States Patent [19]

Babunovic et al.

[11] 3,735,144

[45] May 22, 1973

[54] CONTAINER FLAW INSPECTION APPARATUS

[75] Inventors: Momir Babunovic, Des Peres; Siamac Faani, Crestwood, both of Mo.

[73] Assignee: Barry-Wehmiller Company, St. Louis, Mo.

[22] Filed: July 19, 1971

[21] Appl. No.: 163,704

[52] U.S. Cl. ........................... 250/223 B, 356/240
[51] Int. Cl. .................................. H01j 39/12
[58] Field of Search ............... 250/219 DF, 223 R, 250/223 B; 356/240; 209/111.7

[56] References Cited

UNITED STATES PATENTS

| | | | |
|---|---|---|---|
| 3,191,773 | 6/1965 | Wyman | 250/223 B |
| 3,629,595 | 12/1971 | Babunovic | 250/223 B |
| 3,438,492 | 4/1969 | Albers | 250/223 B |
| 3,529,167 | 9/1970 | Calhoun | 250/223 B |

*Primary Examiner*—James W. Lawrence
*Assistant Examiner*—D. C. Nelms
*Attorney*—Gravely, Lieder & Woodruff

[57] ABSTRACT

Apparatus for inspecting containers, such as glass or plastic bottles, for defects that would render the same unsuitable for commercial use. The apparatus includes means to illuminate each container from more than one position so that defects are highlighted, independently of the orientation of round bodied containers, and means to inspect the container through its filling neck with the area of view and depth of focus selected to be appropriate to the size and character of containers. The inspection means employs photocells arranged in a pattern to make it easy to inspect more or less of the interior of a container and incorporates a lens system having the characteristics of converting an object of substantial depth to an image whose depth is greatly condensed and easily handled by a photocell scanner.

5 Claims, 8 Drawing Figures

3,735,144
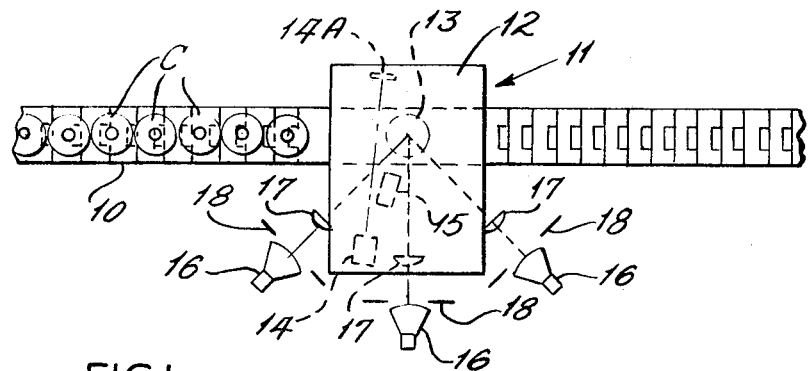
FIG.1
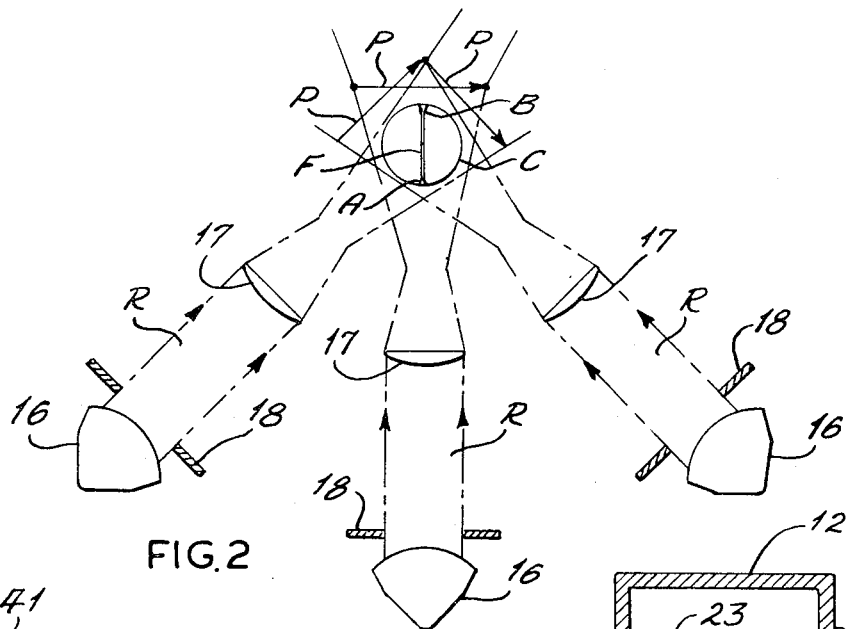
FIG.2
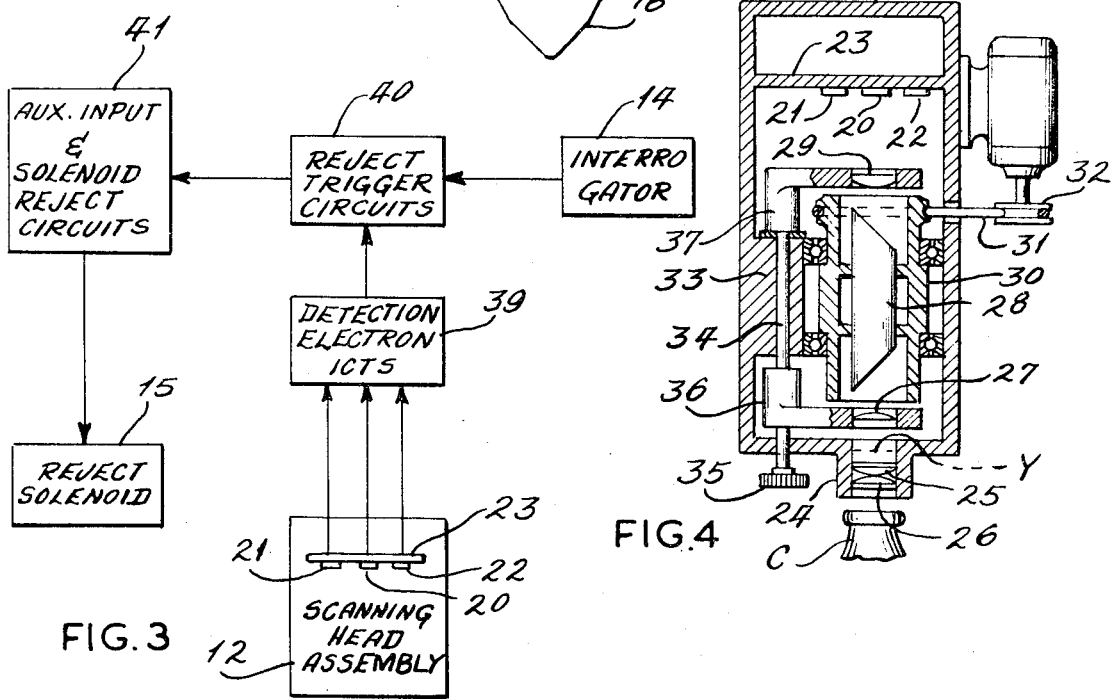
FIG.3
FIG.4

CONTAINER FLAW INSPECTION APPARATUS

SUMMARY OF THE INVENTION

The invention relates to apparatus which detects defects in containers and acts to reject such containers so that containers which eventually carry their contents into the market place will be free of defects and strong enough to withstand the usual rough treatment.

The production of containers is troubled with defects which renders a certain percentage unacceptable for a variety of reasons. These include birdswings which are difficult to detect. Therefore, the present apparatus is arranged to adapt to available conveyor systems, and is responsive to the speed of container movement for initiating a look at each container while in motion.

The object of the invention is to provide apparatus which has the following characteristics:

1. The ability to illuminate the interior space of a container so that defects are highlighted from any angle or position of the detection means.
2. The ability to regulate the field of illumination so that stray light is reduced to a negligible factor.
3. The ability to inspect each container while in motion and to kick out defective containers as soon as each is detected.
4. The ability to look into a container through the filling neck and adapt to variations in the depth of focus so that the depth of the field to be scanned is not critical.
5. The provision of a scanning head having a rotating prism to avoid rotating the container, and stationary photoelectric cells arranged in association to scan more or less of the interior of the container, depending on what defects are being searched for.
6. The improved organization of the foregoing characteristics is an electro-mechanical apparatus that makes unique and new use of some or all of the individual features before enumerated.

In container manufacturing art certain flaws are more objectional than others and of the flaws the most objectional are called "spikes" and "birdswing." A spike flaw or incomplete birdswing is a small or thin filament projecting inwardly from the wall of the container and is of such fineness that the impact of filling the container could break off the filament which would then be hazardous to anyone consuming the contents. A birdswing flaw is a fine filament drawn out and connected to two spaced places on the interior surface of a container. In the manufacture of a flask type of container, birdswings are quite prevalent between the opposite flattened walls of the container which are closest together. Since birdswings in flask type containers are generally oriented to extend between the closest walls, it is relatively easy to orient such containers for maximum results from the scanning apparatus. However, or containers which are round in body and which are rendered defective because of spikes or birdswings, there is no easy way to orient such containers and experience shows that when round containers are conveyed in single file the flaws above mentioned are randomly oriented and this increases the difficulty of detection.

Therefore, another important object of the invention is to provide apparatus which is capable of providing illumination, especially for round bodied containers, that will be independent of flaw orientation, whereby photoelectric cells scanning means may be arranged to look through the filling neck of the containers and be adjusted to see more or less of the interior of each container for the purpose of detecting flaws. Such apparatus is uniquely arranged to utilize the photoelectric cells selectively for scanning and inspecting as much of the container interior as may be desired.

It is another object of the invention to provide uniquely arranged apparatus for detecting flaws in containers, and to provide means for adjusting the apparatus for inspecting containers, depending on the size thereof, so that the flaws are sharply high-lighted as bright spots to enhance the reliability of response of the photocells.

BRIEF DESCRIPTION OF THE DRAWINGS

Certain preferred embodiments of the apparatus are shown in the accompanying drawings, wherein:

FIG. 1 is a schematic plan view of the essential components of the present apparatus as seen without any particular structural coordination which is usually left to the preference of each manufacturer or which is demanded by the installation requirements;

FIG. 2 is a schematic plan view of the lighting system utilized so that container orientation for round bodied containers is not a factor;

FIG. 3 is a diagrammatic wiring layout showing the essential components for translating the finding of a defect or flaw into a container reject stroke at a solenoid device;

FIG. 4 is a fragmentary sectional elevational view of the inspection lens assembly in one of several arrangements to obtain container image rotation;

DESCRIPTION OF THE APPARATUS

Figure 5:
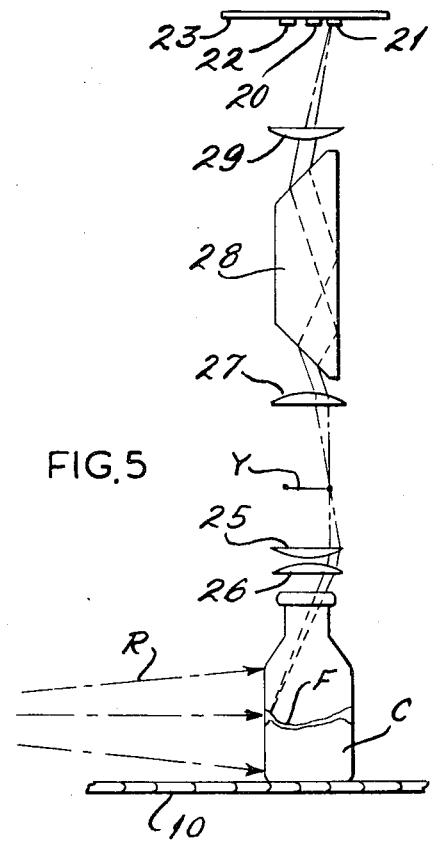
FIG. 5 is a diagrammatic view of the trace or path taken by a bundle of light from one end of a birdswing to the photocell scanning means.

In the preferred apparatus three variable intensity light sources, each having an internal paraboloid reflector, direct three narrow beams of light through adjustable apertures and suitable lenses toward the container which in this case is a round-bodied container. The lenses produce an illuminated image of the apertures beyond the vertical optical axis generally outside the container. The three light sources obviate the need for orientation of each container since that operation is extremely difficult when the containers are being conveyed. When a birdswing flaw is present in a container light from at least one of the light beams will be reflected from some portion of the birdswing filament, and the flaw will appear as a bright spot or bright filament.

The bright light from the birdswing flaw is collected by a lens system to form an image of the defect. The depth of focus of the lens system may be arranged to detect just birdswing flaws in which case the field of view does not include the internal sides of the container. If the internal sides of the container are inspected for flaws, such as spikes, the field of view is increased. The lens system includes a lower pair of lenses each of short focal length but acting as a condensing lens combination of high power, and an adjacent collimating lens which directs the image of the flaw toward a rotating Dove prism. The rotating Dove prism eliminates the need for rotating the container. Adjacent the Dove prism is a second lens which projects the rotating image of the flaw onto a photocell board where a plurality of photocells are arranged radially of the axis of rotation to view the area swept by the rotating prism. The field of view seen by the photocells is normally dark for an acceptable container, but when a flaw is present the flaw will appear as a bright spot. The photocells react to the presence of a bright spot and actuate a container reject mechanism which removes the unacceptable container from the line.

The photocells are connected into an electrical circuit which includes an interrogator responsive to the arrival of each container at the inspection station, and a reject circuit which is energized to actuate the container reject mechanism in response to a photocell reaction to a a bright spot.

Turning now to the drawings, FIG. 1 illustrates an inspection assembly having a table top conveyor chain 10 supported by suitable means (not shown) so that the containers C are conveyed in upright positions through the zone of the flaw inspection unit 11. The unit 11 is arranged (schematically) with the inspection head 12 over the container path of travel such that the condensing lens 13 is aligned with the place where each container mouth must pass. An interrogator unit 14 is supported at one side of the head 12 and a cooperating mirror or retro-reflective tape 14A is positioned so that a light beam is established in the path of approach of the containers C to the zone of inspection beneath the head 12. The electrical circuit (FIG. 3) may be arranged in a suitable area adjacent the head 12 and is connected to the container reject mechanism 15 located on the underside of head 12. The illumination comprises an arrangement of three light sources, each of which includes a light 16 having an internal parabolic mirror to direct the light toward the focusing lens 17 mounted beyond an adjustable rectangular aperture 18. Each light 16 may be varied to increase or decrease the intensity for compensating for container body or glass colors. The lens 17 focuses the image of the light aperture 18 at planes P (FIG. 2) just beyond the container C. The two side light sources 16 are set to focus the image of the light aperture at each side and in the same manner. In this manner a flaw F such as the birdswing B, is illuminated as a bright object inside the container C.

As each container C passes under the inspection head 12 it breaks the interrogator light beam to set up the reject circuit and prime the reject mechanism 15 should any of the photocells 20, 21 or 22 mounted on the board 23 react to the appearance of a bright spot. As may be seen in FIG. 4 the head 12 is provided with a lens barrel 24 to support a pair of plano-convex lenses 25 and 26 which produce a condensed image of the container interior at Y. This image is viewed by a collimating lens 27 which directs the image upwardly to a Dove prism 28 which reverses the image 180° and projects the image to a final image forming lens 29. The image from lens 29 is viewed by one or more of the photocells 20, 21 or 22 supported by the board 23.

The Dove prism 28 is mounted in a rotatable member 30 supported by suitable bearings so as to be free to be rotated by a belt 31 connected to motor driven pulley 32. A bearing supporting member 33 also supports a shaft 34 which may be turned by an external knob 35. The shaft 34 carried a first bracket 36 in which several different collimating lenses 27 are mounted, and a second bracket 37 in which several different final lenses 29 are mounted. Of course, the lenses 27 and 29 are selected to be compatible with the required necessities of the optical system. The combination of lenses 24 and 25 condenses the depth of the field of view within the container so that the depth of focus is not critical, and these lenses may be chosen to inspect the side walls of the container C or just inspect for birdswing flaws F. The presence of Dove prism 28 effects rotation of the field of view within the container C so that it is not necessary to rotate the container, thereby achieving a much simpler apparatus without loss of effectiveness. The use of three light sources 16 also simplifies the apparatus as there is no need to pre-orient the containers, and the flaws being sought are caused to appear as bright spots.

The diagram of FIG. 3 shows the photocells 20, 21 and 22 wired into a detection electronics unit 39 which includes individual cell amplifiers and gain controls wired into a video and gate unit. The detection unit 39, whenever it reacts to a light increase due to a bright spot from a flaw, sends a signal or electrical pulse to the reject triggered circuit unit 40. The latter unit is readied each time a container intercepts the light beam from interrogator 13 to pass its impulse to reject trigger circuit 40. Only when unit 40 is then triggered by the presence of a flaw will an electrical pulse get through to unit 41 to energize the reject solenoid 15 to remove or push the faulty container C from the conveyor 10.

Referring to FIGS. 2 and 5, container C on conveyor 10 is shown with a birdswing flaw F indicated to have its respective ends A and B on the sides of the container. The light beam R (FIG. 2) having a precisely shaped rectangular envelope of light is directed from each light source 16 to pass through the container location or station axially aligned with the condensing lenses 25 and 26. The image of the aperture 18 is, therefore, formed at the lines P (FIG. 2) so that all of the container interior is illuminated and any flaw therein will be caused to glow and reflect some light upwardly through the mouth of the container C. The reflected light could come from a point or a major portion of the flaw filament. The condensing lens consists of two similar plano-convex lens of short focal length used as a pair to constitute a condensing lens combination of relatively high power. The combination of lens in barrel 24 will condense the depth of focus of the container and produce a sharp image B-A of the birdswing flaw F at the focal plane Y of the collimating lens 27 which transmits the image B-A to the rotating prism 28 which passes the image to the final plano-convex lens 29. The final lens 29 will form the image on a focal plane which determines the location of the photocell board 23. In the view of FIG. 5 the shaded area depicts the path of the light bundle emanating from the end portion A of the birdswing flaw A-B. The only moving component in the scanning head 12 is the prism which, due to its characteristics, rotates the image B-A 180° out of phase with its true position and through two complete rotations for each one rotation of the prism.

Figure 6:
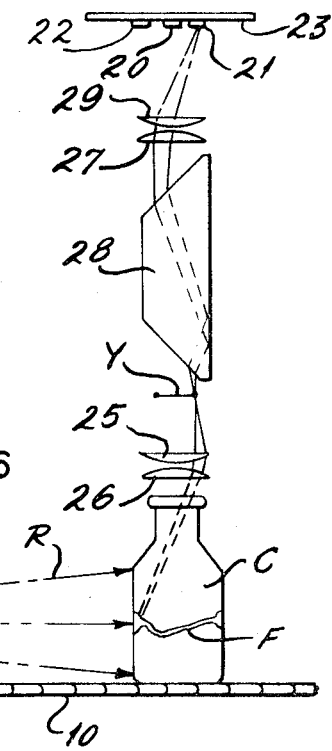
FIG. 6 is a diagrammatic view of the trace or path taken by a bundle of light through a modified lens system.

In FIG. 6 there is shown diagrammatically a variation in the scanning head 12. Here the birdswing flaw F is projected by the condensing lenses 25 and 26 to a focal plane B-A at location Y just below the Dove prism 28. The collimating lens 27 and final lens 29 of FIG. 5 are now combined at the top of the prism 28 and will see the image B-A at its effective focal length through prism 28. The lens combination 27–29 will form the image on the photocell board 23 as noted above. The advantages of this modification are that the final image on the photocell board is brighter due to the shorter length of the optical path, the longer focal length of the collimating lens will give a sharper image, better optical alignment is achieved with the collimating and final lens in the same holder, and the scanner head is more compact.

Figure 7:
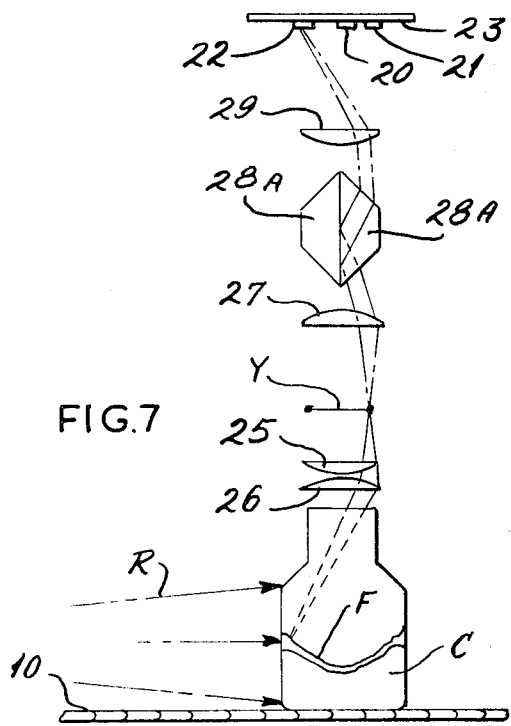
FIG. 7 is a further diagrammatic view of a trace or path taken by a bundle of light through a modified lens system.

In the diagrammatic view of FIG. 7, a double Dove prism 28a is applied in the lens system described in FIG. 5. The double prism consists of two Dove prisms with the reflecting surfaces cemented together. This cuts the length of the prism in half, although it must be used only in parallel or collimated light. The prism 28a has the advantages over a single Dove prism in that the final image at the photocells will have less aberration due to the reduced physical length of the prism and improved distribution of the light rays reaching the prism. Also, the shortening of the prism will make the scanner more compact.

Figure 8:
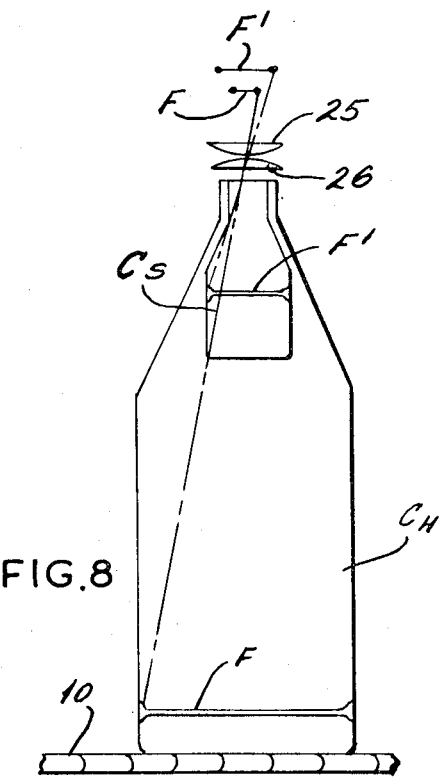
FIG. 8 is a diagram similar to other views, but in this case it shows the great advantage of the optical system utilized herein.

Turning now to FIG. 8, it can be seen that the depth of focus is advantageous as the scanner lens system can be used for containers of wide variations in height. In this view the container $C_H$ is shown to be about three times the height of container $C_S$. Each has a birdswing flaw F and F' respectively, such that there is about a 10 inch difference in the location of the flaws from the common plane occupied by the mouth of the containers. The condensing lenses 25 and 26 produce the real images of flaws F and F' about one-half inch apart. Using the approximate dimensions given here it will follow that the condensing lenses will condense the depth by about 95 percent, or in the ratio of 0.5 inches to 10 inches which equals 5 percent difference in image depth difference.

It can be appreciated that when scanning the entire cylindrical surface of the container interior the image formed by the condensing lenses 25–26 will be in the form of a frustum of a cone, since there is a substantial depth to the container surface. The ability of the lens system in this apparatus to handle a considerable depth of focus is unique and it contributes to the simplicity of the operation, as for changes in height of containers the entire scanner head 11 is moved to a position where lens barrel is at the optimum distance from the mouth. The use of three sources of light produces uniform illumination of the container and defects in the interior will be able to glow and reflect light regardless of theorientation. Thus, the optical lens system will produce the image as a bright spot or filament at the photocell board, and this will activate the electronic circuitry to reject the container. Containers which do not develop bright light reactions pass through without activating the reject mechanism. These and other features comprise the uniqueness of the apparatus disclosed and described herein.

What is claimed is:

1. Container flaw inspection apparatus comprising: means to convey axially elongated round bodied containers along a horizontal path which includes an inspection station; a plurality of light sources, each having a light admitting aperture and focusing lens means forming a sharp light beam projected at said inspection station to form an image of said aperture at a plane just beyond said inspection station, said light sources being angularly spaced about said inspection station and directing said respective light beams at the side of a container moving through said inspection station thereby causing a flaw image in the container to glow irrespective of the orientation of the container flaw; flaw image condensing lens means located in axial alignment with the container filling mouth, said condensing lens means having a focal depth substantially equal to the height of the container above the container bottom; photocell means axially aligned with and spaced from said condensing lens means so as to be responsive to the presence of the flaw image glow in a container; and a lens-prism system between said condensing lens means and said photocell means to rotate and collimate the flaw image, said prism in said lens-prism system being rotatable about the longitudinal axis of the container to rotate the flaw image relative to said photocell means and the container.

2. The apparatus of claim 1 wherein each said light admitting aperture is a beam shaping aperture which is rectangular, and each light source focusing lens is arranged to focus the image of said beam shaping aperture.

3. Container flaw inspection apparatus comprising: means to convey round containers in vertically upright positions along a horizontal path which includes an inspection station; a plurality of light sources arranged in laterally spaced relation in the inspection station such that each light source directs a beam upon the container from a different position and in a direction converging on the container to cause flaws to pick up the light and become bright spots; image condensing lens means disposed at the inspection station to align with the vertical axis of a container above the container mouth to project an image of a predetermined volume of the container interior and transmit the image of flaws as bright spots illuminated by said light sources; photocell means aligned with the image axis of said image condensing lens means and being responsive to the presence of bright spots; and a lens-prism system between said image condensing lens means and said photocell means to collimate the illuminated image, said prism in said lens-prism system being rotatable relative to said photocell means and the actual container.

4. Container flaw inspection apparatus comprising: conveyor means moving a stream of round containers in vertically erect mouth up positions successively through an inspection station; light activated means spaced above the stream of containers and aligned over said inspection station; a system of lens and prism means disposed between said light activated means and the open mouth of the container in said inspection station, said lens means projecting an image of the container interior toward said light activated means, said prism means being rotatable for rotating the projected image relative to and about the vertical axis of the container; and illumination means adjacent said inspection station including individual light projectors spaced generally horizontally from the side of the container being inspected, and said individual light projectors being arranged to project its light beam at the container from different angles, whereby the containers in the stream moved by said conveyor reach the inspection station in any angular orientation and internal flaws are illuminated by one or more of said illumination means and appear as bright spots in the container image.

5. Container interior flaw inspection apparatus comprising: means to move round containers in a flow through an inspection station; a flaw scanning head at the inspection station and axially beyond the container mouth including means to rotate the image of the container interior, lens means cooperating with said image rotating means to condense the real depth of the interior of the containers to an image depth, and photocell means beyond said image rotating means from the container to scan the image depth of the container interior; electrical circuit means including means responsive to photocell reaction to a flaw, and a container reject circuit for removing a flawed container from the flow thereof, said reject circuit being activated by said photocell means; and a plurality of sources of light directed upon the containers at the inspection station from different horizontally spaced locations to illuminate flaws therein which cause said photocells to react, said light sources being effective independently of the orientation of the container flaws relative to said light sources.

* * * * *